(12) United States Patent
Furuta et al.

(10) Patent No.: US 8,475,948 B2
(45) Date of Patent: Jul. 2, 2013

(54) MAGNETIC RECORDING MEDIUM FOR THERMALLY ASSISTED RECORDING

(75) Inventors: Akira Furuta, Nagano (JP); Tsuyoshi Yoshizawa, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 12/591,454

(22) Filed: Nov. 19, 2009

(65) Prior Publication Data

US 2010/0129686 A1    May 27, 2010

(30) Foreign Application Priority Data

Nov. 19, 2008   (JP) ................................. 2008-295026

(51) Int. Cl.
      *G11B 5/66*       (2006.01)
(52) U.S. Cl.
      USPC ....................................... 428/833.3; 360/135
(58) Field of Classification Search
      None
      See application file for complete search history.

(56) References Cited

U.S. PATENT DOCUMENTS

| | | | | |
|---|---|---|---|---|
| 7,736,765 | B2 * | 6/2010 | Wu et al. | 428/829 |
| 2005/0196650 | A1 * | 9/2005 | Suwa et al. | 428/848 |
| 2006/0292400 | A1 * | 12/2006 | Suwa et al. | 428/826 |
| 2007/0243417 | A1 * | 10/2007 | Murakami et al. | 428/818 |
| 2009/0316289 | A1 * | 12/2009 | Okura | 360/59 |
| 2010/0021772 | A1 * | 1/2010 | Harkness et al. | 428/847 |

FOREIGN PATENT DOCUMENTS

WO    WO-2005/083696 A1    9/2005

* cited by examiner

*Primary Examiner* — Holly Rickman
(74) *Attorney, Agent, or Firm* — Rabin & Berdo, P.C.

(57) ABSTRACT

A magnetic recording medium suppresses an anticipated decline in performance due to heating of the lubricant layer and protective layer in thermally assisted recording, and has superior durability and reliability. The magnetic recording medium comprises a layer stack comprising, in order on a nonmagnetic substrate, at least a magnetic recording layer, adiabatic layer, carbon-based protective layer, and lubricant layer.

11 Claims, 2 Drawing Sheets

MAGNETIC RECORDING MEDIUM FOR THERMALLY ASSISTED RECORDING

CROSS-REFERENCE TO RELATED APPLICATIONS

This application claims priority to Japanese Patent Application 2008-295026, filed Nov. 19, 2008, and Japanese Patent Application 2009-186554, filed Aug. 11, 2009, the entireties of which are incorporated herein by reference.

BACKGROUND OF THE INVENTION

1. Field of the Invention

This invention relates to a magnetic recording medium for thermally assisted recording, and relates to an improvement to enhance the durability and reliability of such a magnetic recording medium.

2. Description of the Related Art

Thermally assisted recording is technology in which the surface of a magnetic recording medium is irradiated with light, and the heating resulting from absorption of light by the medium is used to lower the coercive force Hc of the magnetic recording layer, to assist writing by a magnetic head, enabling magnetic recording at higher recording densities.

A magnetic recording medium is manufactured by layered deposition, in order on a nonmagnetic substrate, of an underlayer, intermediate layer, magnetic recording layer, protective layer, and lubricant layer. Among these layers, it is the magnetic recording layer that holds magnetic data related to recording. In principle, if this magnetic recording layer is heated, the purpose of thermal assist can be attained; but if possible, it is desirable that only the magnetic recording layer be heated, without heating the other layers.

However, heating of the magnetic recording layer in an actual magnetic recording medium is performed by causing light generated outside the magnetic recording medium to be incident on the uppermost surface of the magnetic recording medium. As a result, because each of the above-described layers which are layered on the surface of the nonmagnetic substrate of the magnetic recording medium is extremely thin, normally from several nanometers to several tens of nanometers in thickness, a portion of the incident light reaches not only the magnetic layer (magnetic recording layer), but also to the depth of the intermediate layer and underlayer which are layers below the magnetic recording layer. The light thus arriving is absorbed by the intermediate layer and underlayer, and is converted into thermal energy, heating the intermediate layer and underlayer.

Further, because the magnetic recording layer comprises as the main constituent material Co, Fe, or another ferromagnetic metal, thermal conductivity is generally high. The protective layer on this magnetic recording layer comprises diamond-like carbon (hereafter "DLC"), which has a still higher thermal conductivity. Hence after light irradiation for thermal assist, the temperature of the protective layer and of the lubricant layer deposited on the protective layer rises to approximately the same temperature as the magnetic recording layer due to the heat conveyed by successive thermal conduction from the underlayer, intermediate layer, and magnetic recording layer.

With respect to such a magnetic recording medium for thermally assisted recording, a magnetic recording medium is known which comprises a recording film having, at least, a recording film with magnetic anisotropy on a disk substrate, and comprising, on the recording film, at least a lubricant layer, with a protective layer with lower thermal conductivity than the recording film interposed therebetween. It has been disclosed that, by means of a magnetic recording medium configured in this way, thermal transmission to the lubricant layer due to the temperature increase in the magnetic recording layer is blocked, and temperature increases in the magnetic head used for recording and reproduction can be prevented (WO2005/083696 pamphlet (Embodiment 3, FIG. 3)).

In a magnetic recording medium of the prior art, when the medium is heated by light irradiation in thermally assisted recording, in addition to the magnetic recording layer in question, the temperature of the protective layer and lubricant layer also rises due to thermal conduction from the magnetic recording layer. The protective layer and lubricant layer comprise materials such as organic polymers and amorphous carbon which have relatively low thermal resistance, and so there is a high risk of performance degradation due to heating.

To provide further explanation of performance degradation due to heat in the protective layer and lubricant layer, the protective layer is formed using DLC, and the lubricant layer is formed using polymers of perfluoro polyether (hereafter "PFPE") with a molecular weight of approximately 1000 to 10,000. By adopting this configuration, the protective layer and lubricant layer each play important roles in ensuring the long-term reliability of the magnetic recording medium; however, both materials have the property of being vulnerable to heat. As a result, when thermally assisted recording is performed using a magnetic recording medium of the prior art, the DLC protective layer undergoes film degradation and a reduction in thickness due to oxidation, and the PFPE lubricant layer undergoes characteristic degradation due to thermochemical molecular reactions as well as a reduction in thickness due to evaporation, and so there is a heightened rise of the occurrence of such problems as worsened reliability, shortened lifetimes, and increased rates of damage.

SUMMARY OF THE INVENTION

This invention was devised in light of the above problems, and has as an object to provide a magnetic recording medium which suppresses declines in performance due to heating of the lubricant layer and protective layer which is assumed in thermally assisted recording and which has superior durability and reliability, and also to provide a magnetic recording medium with reduced magnetic spacing.

A magnetic recording medium of this invention comprises a layer stack comprising, in order on a nonmagnetic substrate, at least a magnetic recording layer, adiabatic layer, carbon-based protective layer, and lubricant layer.

It is preferable that the thermal conductivity of a principal constituent material of the adiabatic layer of the magnetic recording medium be 21 W/(m·K) or lower.

It is preferable that the adiabatic layer of the magnetic recording medium comprise, as the principal constituent material, at least one type of oxide selected from among $SiO_2$, $TiO_2$, and $ZrO_2$.

The adiabatic layer of the magnetic recording medium may preferably comprise a layer stack comprising two or more layers of different constituent materials.

It is still more preferable that the adiabatic layer of the magnetic recording medium comprise, as the principal constituent material, an $SiO_2 \cdot Al_2O_3$ complex compound.

It is desirable that the film thickness of the adiabatic layer of the magnetic recording medium be 0.1 nm or greater and 5 nm or less.

The adiabatic layer of the magnetic recording medium may preferably have the functions of a magnetic recording layer or of a protective layer.

The adiabatic layer of the magnetic recording medium may still more preferably have a function to reduce the corrosion elution amount from the underlying magnetic recording layer to ½ or less compared with a magnetic recording medium into which an adiabatic layer has not been introduced.

By means of this invention, increases in temperature due to thermal conduction from the magnetic recording layer to the protective layer and to the lubricant layer during execution of thermally assisted recording are suppressed, so that performance degradation of the protective layer and lubricant layer due to higher temperatures can be prevented, and durability and reliability can be secured.

In addition, no only is it simply the case that the thermal conductivity of the adiabatic layer material is low, but by for example using a material which also combines functions such as corrosion suppression which have in the prior art been the purpose of a protective layer, the protective layer can be made thinner, so that compared with a layer structure in which an adiabatic layer is simply inserted, advantageous results are obtained with respect to magnetic spacing, and recording densities can be improved.

DESCRIPTION OF THE PREFERRED EMBODIMENTS

In this invention, in addition to the layer configuration of conventional magnetic recording media, the usefulness in thermally assisted recording of a layer configuration in which an adiabatic layer is newly introduced between the magnetic recording layer and a carbon-based protective layer is shown through simulations using non-steady-state heat conduction analysis for heat flow and for light transmission and absorption.

As the structure of the magnetic recording medium used in the analysis model, a structure was assumed in which an underlayer, an intermediate layer, a magnetic recording layer, an adiabatic layer, and a carbon-based protective layer are layered, in order, on a nonmagnetic substrate.

Figure 2:
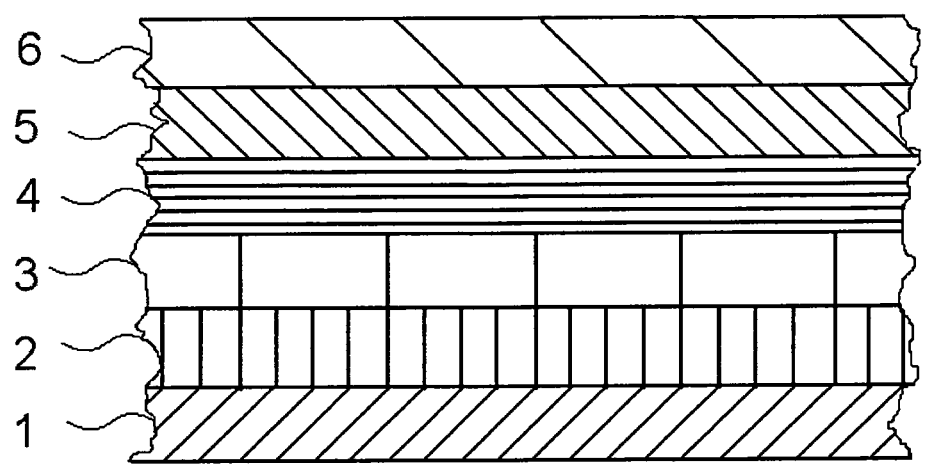
FIG. 2 is a cross section view of an exemplary portion of magnetic recording medium.

As the material of each layer, glass for the nonmagnetic substrate, FeTaC for the underlayer, Ru for the intermediate layer, $CoCrPt\text{—}SiO_2$ for the magnetic recording layer, and DLC (diamond-like carbon) for the carbon-based protective layer were kept unchanged as the structure of representative magnetic recording media, and the values of the refractive index, extinction coefficient, thermal conductivity, and volumetric heat capacity corresponding to these respective materials were used in the analysis. With respect to the adiabatic layer, after fixing the refractive index, extinction coefficient, volumetric heat capacity, and other parameters as constant values without specifying the material, the thermal conductivity was changed among various values, and the dependence on the thermal conductivity of the adiabatic effect was evaluated. The specific physical properties of each of the layers are as shown in Table 1, and an exemplary configuration of a magnetic recording medium according to Table 1 is shown in FIG. 2. As the value of the volumetric heat capacity in Table 1, a notation such as 2.0E+06 for example represents $2.0 \times 10^{06}$.

TABLE 1

| Name (Layer) | Material | Thickness (nm) | Refractive index ($\lambda = 405$ nm) | Extinction coefficient ($\lambda = 405$ nm) | Thermal conductivity (W/(m·K)) | Volumetric heat capacity (J/(K·m³)) |
|---|---|---|---|---|---|---|
| Substrate (1) | Glass | — | 1.50 | 0.00 | 1.5 | 2.0E+06 |
| Underlayer (2) | FeTaC | 60 | 2.197 | −2.06 | 90.4 | 3.13E+06 |
| Intermediate layer (3) | Ru | 10 | 2.197 | −2.06 | 120.0 | 2.94E+06 |
| Recording layer (4) | CoCrPt—SiO₂ | 10 | 2.197 | −2.06 | 92.4 | 3.42E+06 |
| Adiabatic film (5) | — | 0.5-5.0 | 1.450 | 0.00 | 0.1-21.0 | 1.89E+06 |
| Protective film (6) | DLC | 5 | 1.51 | −1.00 | 700.0 | 1.30E+06 |

As the light used in heating, near-field light of a blue-purple laser light source is assumed. The wavelength was taken to be 405 nm, the spot full width at half-maximum was 50 nm, the power was 5 mW, and the magnetic recording medium was assumed to be irradiated continuously with the light from the perpendicular direction.

As the operating conditions of the hard disk drive (HDD), an ordinary 2.5 inch HDD was assumed, with a medium rotation rate of 4200 rpm; the model assumed an operation of writing to the outermost circumference at r=32 mm, and the medium was assumed to move at a linear velocity of 14.1 m/s in a direction perpendicular to the optical axis of the incident light.

Based on the above conditions, a non-steady-state heat conductivity analysis technique was used to calculate the temperature distribution within the medium when the film thickness and thermal conductivity of the adiabatic layer were set to various values. Table 2 shows the ratio of the peak temperature of the magnetic recording layer portion to the peak temperature of the protective layer portion (protective layer/recording layer) (%) obtained as a result.

TABLE 2

| Adiabatic layer design | | Protective layer/ recording layer Temperature increase ratio (%) |
|---|---|---|
| Thermal conductivity (W/(m·K)) | Film thickness (nm) | |
| No adiabatic layer | | 95 |
| 21.00 | 1.0 | 91 |

TABLE 2-continued

| Adiabatic layer design | | Protective layer/ recording layer Temperature increase ratio (%) |
|---|---|---|
| Thermal conductivity (W/(m · K)) | Film thickness (nm) | |
| 21.00 | 5.0 | 83 |
| 10.00 | 1.0 | 88 |
| 8.45 | 1.0 | 86 |
| 8.45 | 1.5 | 83 |
| 8.45 | 2.0 | 82 |
| 5.00 | 1.0 | 83 |
| 1.50 | 0.5 | 79 |
| 1.50 | 1.0 | 72 |
| 1.50 | 3.0 | 64 |
| 1.50 | 5.0 | 61 |
| 1.00 | 1.0 | 69 |
| 0.50 | 1.0 | 62 |
| 0.10. | 1.0 | 50 |

When there is no adiabatic layer, the peak temperature value of the protective layer is 95% that of the magnetic recording layer, so that the temperature rises to approximately the same level, but when the thermal conductivity is 21.0 W/(m·K) and the film thickness is 1.0 nm, this is suppressed to 91%. It is seen that as the adiabatic layer thickness is further increased, or the thermal conductivity is lowered, the relative temperature increase in the protective layer is further suppressed.

With respect to the film thickness of the adiabatic layer, the thinner the film the smaller is the adiabatic effect, and the thicker the film the greater is the adiabatic effect; but there is a limit imposed by the reduction in the magnetic spacing performance, and so it is preferable that the film thickness of the adiabatic layer/be approximately 0.1 nm to 5 nm. The above results indicated that as the design of a magnetic recording medium for thermally assisted recording, introduction of an adiabatic layer between the magnetic recording layer and the protective layer is useful. According to a chemical reference, thermal conductivities (W/m·K) are 1.38 (300K) for $SiO_2$ glass, 8.4 (300K) for $TiO_2$ polycrystals, 21 (according to the Rika Nenpyou) for $Al_2O_3$ (alumina), and 4.0 for $ZrO_2$ (zirconia).

As the design of the adiabatic layer introduced at this time, from the standpoint of thermal design in thermally assisted recording it is of course desirable that the thermal conductivity be lower and that the film be thick; on the other hand, in order to insert an adiabatic layer between the magnetic recording layer and the protective layer thereabove, even if for example the adiabatic layer is thin, an impediment to improvement of the recording density is unavoidable, insofar as the so-called magnetic spacing, which is the gap during recording and reproduction between the head recording/reproduction element and the magnetic recording layer, is expanded.

Hence in actual introduction into the design of a magnetic recording medium, it is important that the design be optimized in terms of the trade-off with improved recording densities which are made possible by more powerful thermal assistance, due to the fact that the assumed temperature of use of the magnetic recording layer can be made higher due to the effect of the adiabatic layer.

Further, in this invention it is preferable that a layer structure which effectively suppresses expansion of the magnetic spacing, by adopting in the adiabatic layer a material which can partially replace functions of the magnetic recording layers of the prior art, be employed. The layer structure of this invention adopts as the adiabatic layer material, for example, a metal of a certain type with comparatively low thermal conductivity, and which moreover has constant magnetic properties, such that the adiabatic layer is made to serve as a portion of the magnetic bits. In this case, if the adiabatic layer functions sufficiently to replace the magnetic recording layer, then even an adiabatic layer material with comparatively high thermal conductivity and poor adiabatic effect can be made thicker, so that the adiabatic effect can be enhanced.

As still another invention, it is preferable that a layer configuration be employed in which the adiabatic layer replaces a portion of the functions of protective layers in the prior art. The layer structure of this invention adopts as the adiabatic material, for example, a compound material such as $SiO_2$, $ZrO_2$, or similar with low thermal conductivity and which is stable with respect to oxidation reactions, to cause the adiabatic layer to replace the function of suppressing corrosion by oxidation of the magnetic metal material in the magnetic recording layer, which in the prior art is a function of the protective layer. By means of this invention, through the effect of the adiabatic layer in suppressing corrosion, the original film thickness of the protective layer can be reduced insofar as design specifications are unnecessarily strict, so that there is the advantage that expansion of the magnetic spacing can be prevented. In this case, a greater effect of the adiabatic layer in suppressing corrosion elution from the magnetic recording layer is preferable, but compared with a configuration in which no adiabatic layer is present, a material and film thickness which enable suppression of the amount of corrosion elution from the magnetic recording layer to ½ or less are desirable for attaining an object of this invention in particular.

As a practical example, results for Co corrosion elution experiments versus film thickness when an $(Al_2O_3)_{94}.(SiO_2)_6$ adiabatic layer was introduced are described below. As the protective layer DLC was used, and as the magnetic recording layer CoCrPt—$SiO_2$ was used; $O_2$ gas was used as a film deposition gas in reactive sputtering of an $(Al)_{97}.(SiO_2)_3$ target to deposit an $Al_2O_3.SiO_2$ film which was inserted between the protective layer and the magnetic recording layer as the adiabatic layer, to fabricate evaluation samples. These evaluation samples had various film thicknesses of the adiabatic layer and protective layer, as indicated in Table 3 below. The amounts of Co corrosion elution in each of these evaluation samples were investigated. To study the dependence on the $Al_2O_3.SiO_2$ film thickness of the evaluation results, in the graph of FIG. 1 the $Al_2O_3.SiO_2$ film thickness was plotted along the horizontal axis and the logarithm of the Co corrosion amount was plotted along the vertical axis, with the DLC film thickness varied as a parameter (2.0 nm and 2.5 nm). As a result, it was found that as the $Al_2O_3.SiO_2$ film thickness was increased, not only was there clearly a reduction in the amount of Co corrosion elution, but the Co corrosion elution amount decrease substantially exponentially with increasing $Al_2O_3.SiO_2$ film thickness.

TABLE 3

| $Al_2O_3$—$SiO_2$ adiabatic layer (nm) | DLC protective layer (nm) | Co corrosion | |
|---|---|---|---|
| | | Co (cg/cm$^2$) | Co (log) |
| 3.0 | 2.5 | 0.005 | −2.30 |
| 2.0 | 2.5 | 0.097 | −1.01 |
| 1.0 | 2.5 | 0.0196 | −0.71 |
| 0.0 | 2.5 | 0.632 | −0.20 |
| 3.0 | 2.0 | 0.023 | −1.64 |
| 2.0 | 2.0 | 0.145 | −0.84 |
| 1.0 | 2.0 | 0.344 | −0.46 |
| 0.0 | 2.0 | 1.038 | −0.02 |

Figure 1:
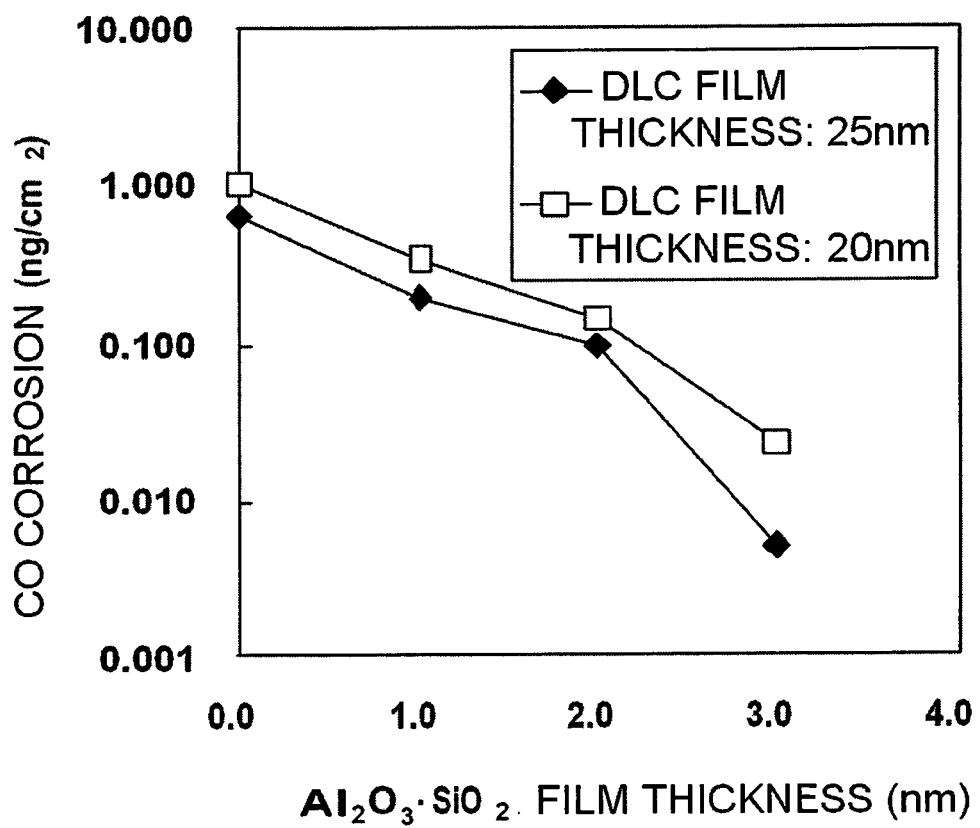
FIG. 1 is a graph showing the dependence on the $Al_2O_3 \cdot SiO_2$ adiabatic layer thickness of Co corrosion in this invention, taking the DLC film thickness as a parameter.

In order to compare the dependences of the Co corrosion elution amount shown in FIG. 1 on the DLC protective layer film thickness and on the $Al_2O_3.SiO_2$ adiabatic layer thickness, a least-mean-square method linear approximation was used to perform evaluations. Upon taking y to be the logarithm of the Co corrosion amount and $x_1$ and $x_2$ to be the $Al_2O_3.SiO_2$ film thickness and the DLC film thickness respectively, when the approximating equation $y=m_1x_1+m_2x_2+b$ was used to perform approximation, $m_1$ was approximately −0.65 and $m_2$ was approximately −0.60. This means that for each 1 nm increase in the thickness of the $Al_2O_3.SiO_2$ film, the Co corrosion amount changes by a factor of $10^{-0.65}$, that is, decreases by approximately 23%, and for each 1 nm increase in the thickness of the DLC film, the Co corrosion amount changes by a factor of $10^{-0.60}$, that is, decreases by approximately 25%.

From this it is seen that the function of the $Al_2O_3.SiO_2$ film in suppressing corrosion is substantially equivalent to that of a conventional DLC protective layer. Hence when an $Al_2O_3.SiO_2$ film is introduced as an adiabatic layer, corrosion characteristics of the magnetic recording medium are unchanged even when the DLC protective layer thickness is decreased by the amount of the thickness of the introduced adiabatic layer, so that no magnetic spacing loss occurs, and only the advantage of an improvement in the thermal resist effect is obtained by introduction of the adiabatic layer.

According to the above-described practical example of this invention, by newly adding an adiabatic layer between the magnetic recording layer on the one hand and the protective layer and lubricant layer on the other, temperature increases due to heat conduction from the magnetic recording layer to the protective layer and lubricant layer during execution of thermally assisted recording can be suppressed, so that performance degradation due to increases in temperature of the protective layer and lubricant layer can be prevented, and durability and reliability can be secured.

In addition, by using as the adiabatic layer material a material which not only has low thermal conductivity, but also has a function provided by a protective layer of the prior art, such as for example corrosion suppression, the protective layer can be made thinner by the amount of this film thickness, and so compared with a layer configuration in which an adiabatic layer is simply inserted there is an advantage with respect to magnetic spacing, and the recording density can be improved. In the above description of a practical example, a case was explained of an $Al_2O_3.SiO_2$ film comprising $SiO_2$ as the principal constituent material of the adiabatic layer having a corrosion suppression function; but it is also preferable to use, in place of an $Al_2O_3.SiO_2$ film, a multilayered film of two or more layers combining any among $TiO_2$ film, $ZrO_2$ film, and $Al_2O_3.SiO_2$ film.

What is claimed is:

1. A magnetic recording medium for use in a thermally assisted recording apparatus, comprising:
   a nonmagnetic substrate having a flat surface; and
   a layer stack including at least a magnetic recording layer for magnetically storing bits, an adiabatic layer on the magnetic recording layer, a carbon-based protective layer on the adiabatic layer to provide protection from contact with a magnetic read/write head, and a lubricant layer on the carbon-based protective layer, the layer stack being disposed above the flat surface of the nonmagnetic substrate,
   wherein the adiabatic layer inhibits transfer of heat developed in the magnetic recording layer during thermally assisted recording to the carbon-based protective layer and the lubricant layer, and
   wherein the adiabatic layer includes a film that comprises $ZrO_2$, the film being a continuous film that extends parallel to the flat surface of the substrate.

2. The magnetic recording medium according to claim 1, wherein the film has a thermal conductivity lower than 21 W/(m·K).

3. The magnetic recording medium according to claim 2, wherein the $ZrO_2$ is a principal constituent material of the adiabatic layer, and wherein the adiabatic layer further comprises a second constituent material different from the principal constituent material.

4. The magnetic recording medium according to claim 1, wherein the film thickness of the adiabatic layer is between 0.1 nm to 5 nm.

5. The magnetic recording medium according to claim 1, wherein the film thickness of the adiabatic layer is between 0.5 nm to 5 nm.

6. The magnetic recording medium according to claim 1, wherein the adiabatic layer reduces a corrosion elution amount from the underlying magnetic recording layer to 25% or less per 1 nm of the film thickness of the adiabatic layer.

7. The magnetic recording medium according to claim 1, wherein the adiabatic layer has a thickness of less than 2 nm.

8. The magnetic recording medium according to claim 1, wherein adiabatic layer has a thickness not greater than about 1 nm.

9. The magnetic recording medium according to claim 1, wherein the adiabatic layer is a single layer consisting solely of the $ZrO_2$.

10. The magnetic recording medium according to claim 1, wherein the adiabatic layer has a thickness of less than 1.9 nm.

11. A magnetic recording medium for use in a thermally assisted recording apparatus, comprising:
    a nonmagnetic substrate having a flat surface; and
    a layer stack including at least a magnetic recording layer for magnetically storing bits, an adiabatic layer on the magnetic recording layer, a carbon-based protective layer on the adiabatic layer to provide protection from contact with a magnetic read/write head, and a lubricant layer on the carbon-based protective layer, the layer stack being disposed above the flat surface of the nonmagnetic substrate,
    wherein the adiabatic layer inhibits transfer of heat developed in the magnetic recording layer during thermally assisted recording to the carbon-based protective layer and the lubricant layer, and
    wherein the adiabatic layer includes a $(SiO_2)_6.(Al_2O_3)_{94}$ complex compound film, the film being a continuous film that extends parallel to the flat surface of the substrate.

* * * * *